US009025677B2

(12) United States Patent
Gervais et al.

(10) Patent No.: US 9,025,677 B2
(45) Date of Patent: May 5, 2015

(54) METHOD, NOTABLY FOR OPTIMIZING THE COMPRESSION OF A VIDEO AND/OR AUDIO FILE, USING A CODEC ASSIGNING A WEIGHT IN BITS PER SECOND TO THE CORRESPONDING COMPRESSED FILE, AND ASSOCIATED SYSTEM

(71) Applicant: I-CES (Innovative Compression Engineering Solutions), Paris (FR)

(72) Inventors: Than Marc-Eric Gervais, Paris (FR); Bruno Loubet, Paris (FR)

(73) Assignee: I-CES (Innovative Compression Engineering Solutions), Paris (FR)

( * ) Notice: Subject to any disclaimer, the term of this patent is extended or adjusted under 35 U.S.C. 154(b) by 409 days.

(21) Appl. No.: 13/626,320

(22) Filed: Sep. 25, 2012

(65) Prior Publication Data

US 2014/0044199 A1 Feb. 13, 2014

(30) Foreign Application Priority Data

Aug. 10, 2012 (FR) .................. 12 57769
Aug. 13, 2012 (FR) .................. 12 57777

(51) Int. Cl.
*H04N 11/02* (2006.01)
*H04N 19/115* (2014.01)
*H04N 19/117* (2014.01)
*H04N 19/136* (2014.01)

(52) U.S. Cl.
CPC .......... *H04N 19/136* (2013.01); *H04N 19/115* (2013.01); *H04N 19/117* (2013.01)

(58) Field of Classification Search
USPC ....................... 375/240.01–240.29
See application file for complete search history.

(56) References Cited

U.S. PATENT DOCUMENTS

| 5,687,095 | A | * | 11/1997 | Haskell et al. | ............. 348/386.1 |
| 8,411,573 | B2 | * | 4/2013 | Gormley | .................... 370/235.1 |
| 2003/0009722 | A1 | | 1/2003 | Sugiyama et al. | |
| 2003/0235247 | A1 | * | 12/2003 | Wu et al. | .................. 375/240.03 |
| 2009/0010338 | A1 | * | 1/2009 | Wang | .................. 375/240.16 |
| 2009/0034612 | A1 | * | 2/2009 | Zheng et al. | ............. 375/240.03 |
| 2011/0292934 | A1 | | 12/2011 | Oishi | |

FOREIGN PATENT DOCUMENTS

EP          1170955 A1     1/2002

* cited by examiner

*Primary Examiner* — Dave Czekaj
*Assistant Examiner* — Leron Beck
(74) *Attorney, Agent, or Firm* — Young & Thompson

(57) ABSTRACT

A method for compressing a stream by means of a codec (C), provided for assigning to a compressed stream an encoding throughput (Q) measured in bits per second, using a pre-filter (X1) replacing in the header (T1) of the original stream, the restoration frequency (R) with a frequency equal to the product (R×K) of the restoration frequency (R) by a coefficient (K) and then for retransmitting the thereby filtered stream (FX1) to the codec; the post-filter (X2) replacing the restoration frequency (R) into the header (TX2) of a stream (FX2) resulting from the encoding of the pre-filtered stream (FX1) by the codec C.

19 Claims, 1 Drawing Sheet

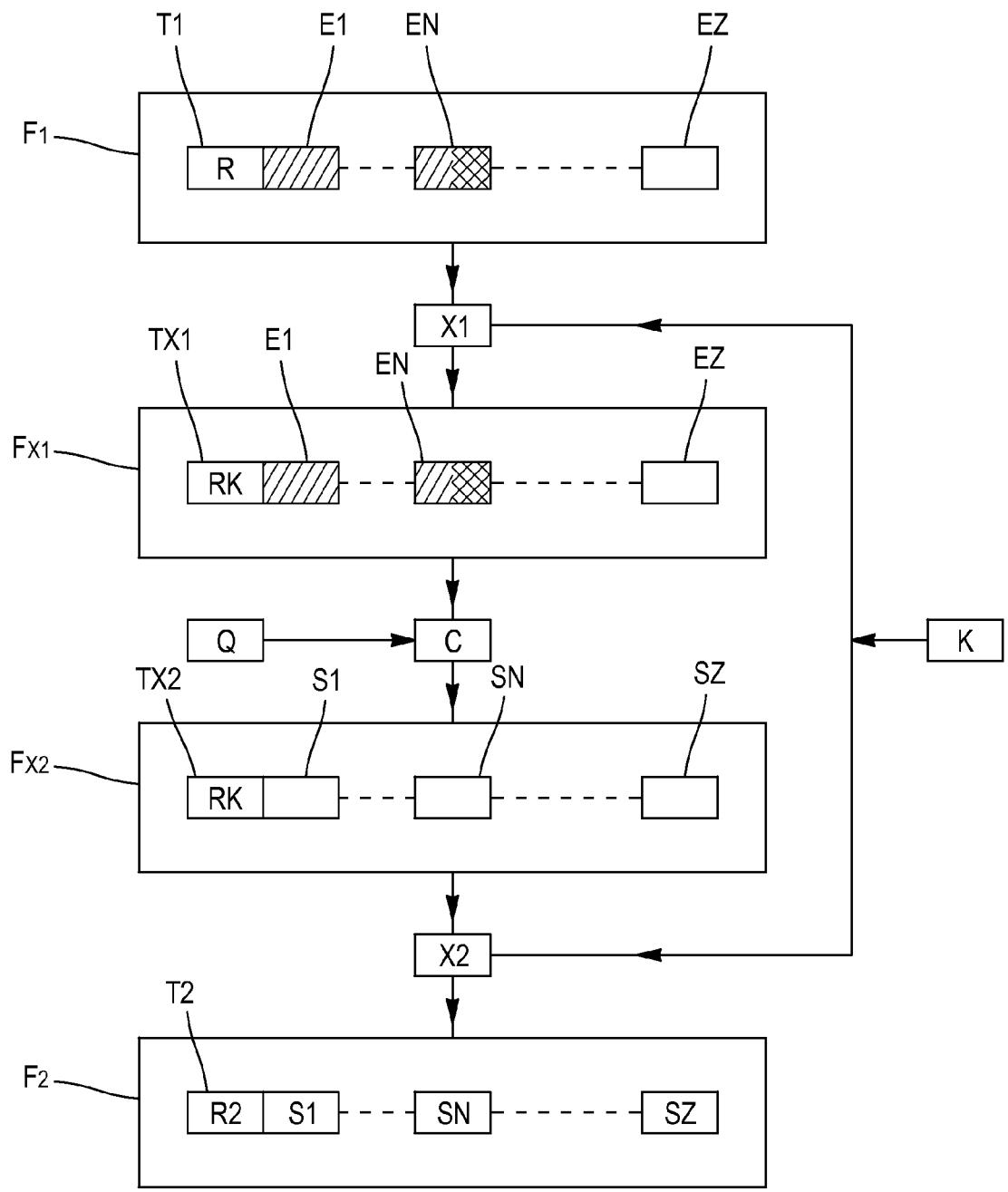

METHOD, NOTABLY FOR OPTIMIZING THE COMPRESSION OF A VIDEO AND/OR AUDIO FILE, USING A CODEC ASSIGNING A WEIGHT IN BITS PER SECOND TO THE CORRESPONDING COMPRESSED FILE, AND ASSOCIATED SYSTEM

FIELD

The present application relates to methods for compressing streams, notably from video and/or audio files.

BACKGROUND

The main standards used presently, notably MPEG4/H264, for the compression of video streams, provide the allocation of a certain throughput to the compressed stream, measured in bits per second, independently of the number of images per second contained in the original stream. Thus, a video file of 10 seconds encoded with a compression throughput of 10 megabits per second (10 Mbps) will have a size of 100 megabits (100 Mb), i.e. 12.5 megabytes (12.5 Mbytes), whether its display frequency is of 50 images per second, i.e. the file contains 500 images or whether its display frequency is 25 images per second, i.e. the file contains 250 images. Further, the codec applying the H264 standard generates in the stream or in the compressed file obtained from the stream or from the original file, groups of images (Group Of Pictures (GOP)). Each group comprises 3 types of compressed images:
- a reference image said to be of type «I», slightly compressed;
- one or more more compressed images «P», predicted and restored only depending on the preceding images of the GOP,
- one or more images «B» predicted and restored both from the preceding and following images of the GOP.

The quality of the restored stream depends on the selected throughput and on the frequency of display and restoration of the processed stream, both of these frequencies being identical with each other in the case of the H264 standard, which retains the number of images between the original stream and the compressed stream. The compression throughput may be selected at the moment of the compression; a throughput of 10 Mbps will allow a restoration of better quality than a throughput of 5 Mbps.

The quality of the restored stream is also dependent on how the GOP is obtained, and therefore on the structure of each GOP, notably on the quality of the reference image of type I, on the number of images of each type «B» or «P» like on their ordering. A large number of «P» images may thus give a jerky aspect during restoration. A large number of images of type «B» or «P» between two successive reference images of type «I», may cause gradual degradation of the restored video, between both reference images, therefore a video of lesser quality.

The H264 standard is widely used for compressing Internet and television video streams. However, restorations of compressed streams, notably according to the standard, have defects which are visibly apparent for the television viewer, while the latter is increasingly more demanding as to the quality of the restoration.

SUMMARY

The object of the invention is therefore to propose a compression method which allows improvement in the restoration, while being able to use existing standards and the corresponding codec, so that the final user, for example the viewer, in the case of a video and/or the listener, in the case of sounds, does not have to change or modify his software packages or hardware for virtual or physical restoration (reader, viewing device, television set . . . ).

Thus, according to a first object, the invention proposes a method for compressing an original stream into a compressed stream, by means of a codec provided for assigning to a stream compressed by said codec, a coding throughput measured in bits per second,
- the coding throughput being independent of the number of elements per second;
- the original stream comprising at least one header and a sequence of successive elements;
- the header of the original stream comprising a restoration frequency in elements per second for the elements of the sequence, the method being characterized in that it comprises the provision of a pre-filter, a post-filter and a compaction coefficient and in that:
- the pre-filter is used before the codec, in order to replace in the header of the original stream, the restoration frequency with a compaction frequency, and then for retransmitting the thereby filtered stream to the codec; and then,
- the post-filter is used for replacing in the header of an encoded stream resulting from the coding of said pre-filtered stream by the codec, the compaction frequency with a restoration frequency for the compressed stream, the value of which is substantially equal to the value of the restoration frequency of the original stream;
- the compression frequency being equal to the product of the restoration frequency by the compaction coefficient.

The original stream may stem from the reading of an original file, for example from the decoding of an original file already compressed.

The method may further comprise a step for recording the compressed stream in a compressed file.

The encoding throughput may be constant, notably in the case of an encoding by the codec, in CBR (Constant Bit Rate). On the other hand, the encoding throughput may be variable, notably in the case of an encoding by the codec in VBR (Variable Bit Rate).

The compaction coefficient is advantageously an integer strictly greater than 1, preferably equal to 2 or to 3. It may also be a decimal number, for example 1.5 or 2.5.

The method may be provided for application to an audio stream, each element being a sound sample and the restoration frequency being the corresponding sampling frequency.

The method may be provided for application to a video stream, each element being a single image, the restoration frequency being a display frequency for the images of the stream. The codec may be provided for forming groups of compacted images (GOP), the images of each group comprising at least one reference image of the «I» type, the other images of the group may be of a type from types «B» or «P».

According to a second object, the invention proposes a method for optimizing 3D streams, the images of which may be multiplexed or not by using a method according to the first object of the invention.

According to a third object, the invention proposes a method for making a global file by assembling several series of compressed elements by a method according to the preceding objects of the invention, each series being compressed with a throughput and/or compaction coefficient which are specific to it.

According to a fourth object, the invention proposes a method for optimizing the performances of a codec, by using a method according to the preceding objects of the invention.

According to a fifth object, the invention proposes a method for encoding a stream in real time or a flow in streaming, by using a method according to the preceding objects of the invention.

According to a sixth object, the invention proposes a system of filters for applying a method according to the preceding objects of the invention.

According to a seventh object, the invention proposes a computer program for applying a method according to the preceding objects of the invention.

According to an eighth object, the invention proposes a physical encoder (hardware) for applying a method according to the preceding objects of the invention.

BRIEF DESCRIPTION OF THE DRAWINGS

Several embodiments of the invention will be described hereafter, as non-limiting examples, with reference to the appended drawings wherein the single FIGURE schematically illustrates a method according to the invention.

DETAILED DESCRIPTION

The FIGURE illustrates steps of a digital compression method for a digital stream F1, called an original stream, into a compressed digital stream. The original stream comprises a header T1 and a sequence of a number Z of successive elements E. The elements E are intended to be restored to a final user, for example a viewer or a listener, at a certain restoration frequency R written in the header T1.

The original stream F1 may result from the reading of an original file. It may also stem from direct recording, for example from a camera in the case of a video stream, or from a microphone in the case of an audio stream.

The compressed stream F2 may be recorded in a compressed file or be simply broadcast, i.e. directly restored, for example via a screen in the case of a video stream or a loud speaker in the case of an audio stream.

The description which follows will be made with reference to video streams. In the illustrated example, each element is therefore a set of digital values allowing reconstruction of an image; by simplification, each element E of the original file F1 will be called an original «image».

The header comprises the frequency at which the elements E have to be restored. Thus, the restoration frequency R is equal to N images per second. In the FIGURE, the illustrated elements are the first element E1 of the series, the last element EN of the first second and the last element of the series EZ.

In the illustrated example, for the encoding, therefore the compression of the stream F1 into the stream F2, a codec C is used meeting the H264 standard. The codec C comprises an input for selecting the encoding throughput Q. The codec C produces compressed images S1 . . . SN . . . SZ, also called slices, (each of the compressed images S1 . . . SN . . . SZ corresponding to a respective original image E1 . . . EN . . . EZ.

According to the invention, two digital filters X1, X2 are used, which can be implemented as physical hardware encoders, or, preferably, as computer program routines, stored on a non-transitory computer readable media, and programmed to run on a computer processor to execute instructions comprising:

a pre-filter X1 for processing the original stream F1; the pre-filter X1 producing from the original stream F1 towards the codec C, a preprocessed stream FX1; and, a post-filter X2 provided for collecting a stream FX2 exiting the codec C; the post-filter X1 producing the compressed stream F2 from the output stream FX2.

The filters X1, X2 comprise a common input for setting a single selected compaction coefficient K. K is a positive number, either integer or decimal, different from 1 and preferably greater than 1. For the use of a codec of the H264 type, K is advantageously selected comprised between 1.5 and 4, preferably equal to 2, or 3.

The pre-filter X1 is designed in order to replace, in the header T1 of the original file F1, the restoration frequency R with a compaction frequency RK; the compaction frequency RK is the product of the restoration frequency R by the compaction coefficient K (RK=R×K). The pre-filter is also provided for keeping the same sequence of the original elements E1 . . . EZ.

As illustrated in the FIGURE, the preprocessed stream FX1 comprises a header T1, containing the compaction frequency RK, and a sequence of a number Z of successive elements E, respectively identical with each of the E1-EZ elements of the original stream F1.

The codec C is provided for encoding the preprocessed stream FX1 at a throughput Q measured in bits per second. The codec C preserves the value of the frequency, so that the header TX2 of the encoded stream FX2 contains the compaction frequency RK. Further, the encoded stream comprises a sequence for which each of the compressed images S1 . . . SN . . . SZ corresponds to a respective original image E1 . . . EN . . . EZ.

The post-filter X2 is designed for replacing in the header TX2 of the encoded stream FX2 the compaction frequency RK with the original restoration frequency R.

Thus the compressed stream F2 comprises a header T2 containing a restoration frequency R2 with a value substantially equal, within computer processing approximations, to that of the restoration frequency R of the original stream F1 and, a sequence of images S1-SZ compressed by the codec C, each corresponding to a respective image E1-EZ of the original stream. In the illustrated example, the value R2 is calculated from the value of the frequency RK of the encoded stream FX2, according to the formula:

$$R2=RK/K$$

The encoded stream FX2 has a throughput QX2 equal to the selected throughput Q, i.e.:

$$QX2=Q$$

The compressed stream has a reduced throughput Q2 equal to the selected throughput divided by the compaction coefficient K, i.e.:

$$Q2=Q/K$$

Surprisingly, it is seen that the obtained quality is clearly improved for a stream compressed with the method according to the invention (for example with Q=10 Mbps and a compaction coefficient K=2, so that the reduced throughput of the compressed file is Q/K=5 Mbps), relatively to a compressed stream obtained by compressing the same original stream F1 with the same codec, but with a selected throughput equal to the reduced throughput (Q=5 Mbps), without using the filters X1, X2 according to the invention. Thus, a method according to the invention allows notable improvement in the perceived restoration quality, without increasing the band pass required for transmitting the stream, or without increasing the weight of a corresponding compressed file, proportional to the reduced throughput (compressed weight=5 kbps×Z/N).

Of course, the invention is not limited to the examples which have been described.

Thus, instead of having the frequency R2 of the compressed stream calculated from the value of the frequency RK of the encoded stream FX2, according to the formula R2=RK/K, provision may be made for the value of the restoration frequency R of the original stream to be stored in memory, and then assigned to the header T2 of the compressed stream F2, so that R2=R.

Moreover, a method according to the invention, equivalent to the one described earlier, may be used for the compression of an audio stream.

The invention claimed is:

1. A method for compressing an original stream (F1) into a—compressed stream (F2), comprising:
    running a pre-filtered stream through a codec (C) to obtain an encoded stream, wherein the codec assigns to the encoded stream, an encoding throughput (Q) measured in bits per second,
        said encoding throughput (Q) being independent of the number (N) of elements per second;
        said original stream (F1) comprising at least one header (T1) and a sequence of successive elements (E1 . . . EN . . . EZ);
        said header of said original stream comprising a restoration frequency (R=N elements per second) for the elements of said sequence (E1 . . . EN . . . EZ);
    executing a pre-filter, a post-filter and a compaction coefficient (K), wherein:
        the original stream is run through the pre-filter (X1) before the codec, for replacing in the header (T1) of the original stream the restoration frequency (R) with a compaction frequency (RK), and then for retransmitting the pre-filtered stream (FX1) to said codec; and then,
        the encoded stream is run through the post-filter (X2) for replacing in the header (TX2) of the encoded stream (FX2) resulting from encoding of said pre-filtered stream (FX1) by said codec (C), the compaction frequency (RK) with a restoration frequency (R2) to obtain the compressed stream, the value of the restoration frequency being substantially equal to the value of the restoration frequency (R) of the original stream;
        said compression frequency (RK) being equal to the product (R×K) of said original restoration frequency (R) by said compaction coefficient (K).

2. The method according to claim 1, wherein the original stream stems from the reading of an original file, for example from the decoding of an already compressed original file.

3. The method according to claim 1, further comprising recording the compressed stream (F2) in a compressed file.

4. The method according to claim 1, wherein the throughput (Q) is a constant throughput.

5. The method according to claim 1, wherein the throughput (Q) is a variable throughput.

6. The method according to claim 1, wherein the compaction coefficient (K) is an integer strictly greater than 1, preferably equal to 2 or to 3.

7. The method according to claim 1, wherein the compaction coefficient (K) is a decimal number.

8. The method according to claim 1, wherein the original stream is a video stream, each element (E) being a single image, the restoration frequency (R) being a frequency for displaying said images (E).

9. The method according to claim 8, wherein the codec forms compacted image groups (GOP), the images of each group comprising at least one reference image of the «I» type, and the other images of the group may be of a type from types «B» or «P».

10. A method for optimizing 3D streams, by using the method according to claim 1, wherein the original stream is a 3D stream.

11. The method according to claim 1, wherein the original stream is an audio stream, and each element (E) is a sound sample and the restoration frequency (R) is a corresponding sampling frequency.

12. A method for making a global file by assembling several series of elements compressed by the method according to claim 1, each series being compressed with a throughput and/or a compaction coefficient which are specific to the series.

13. A method for optimizing the performances of a codec, by using the method according to claim 1.

14. A method for encoding a real-time stream or a flow in streaming, by using method according to claim 1.

15. A system of filters (X1,X2) for applying the method according to claim 1.

16. A computer program stored on a non-transitory storage medium and encoded to execute on a computer processor for performing the method according to claim 1.

17. A physical encoder for performing the method according to claim 1.

18. The method according to claim 6, wherein the compaction coefficient (K) is an integer equal to 2 or to 3.

19. A method for compressing an original stream (F1) into a—compressed stream (F2), comprising:
    passing the original stream (F1) through a pre-filter having a compaction coefficient (K), for replacing, in a header (T1) of the original stream, a restoration frequency (R) with a compaction frequency (RK), and then for retransmitting the thereby filtered stream (FX1), wherein the header of said original stream comprises the restoration frequency (R=N elements per second) for the elements of said sequence (E1 . . . EN . . . EZ);
    passing the filtered stream (FX1) through a codec (C) to obtain a compressed stream, wherein the codec assigns, an encoding throughput (Q) measured in bits per second to obtain an encoded stream, wherein said encoding throughput (Q) is independent of the number (N) of elements per second, said original stream (F1) comprises at least one header (T1) and a sequence of successive elements (E1 . . . EN . . . EZ); and
    passing the filtered stream through a post-filter (X2) for replacing in the header (TX2) of the encoded stream (FX2), the compaction frequency (RK) with a restoration frequency (R2) to obtain the compressed stream, wherein the value of the restoration frequency (R2) is substantially equal to the value of the restoration frequency (R) of the original stream; and
    wherein said compression frequency (RK) is equal to the product (R×K) of said original restoration frequency (R) by said compaction coefficient (K).

* * * * *